(12) United States Patent
Omran et al.

(10) Patent No.: US 12,509,366 B1
(45) Date of Patent: Dec. 30, 2025

(54) NANOCOMPOSITE FOR WATER DECONTAMINATION

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/072,395

(22) Filed: Mar. 6, 2025

(51) Int. Cl.
*C02F 1/28* (2023.01)
*B01J 20/04* (2006.01)
*B01J 20/28* (2006.01)
*C02F 101/20* (2006.01)
*C02F 101/30* (2006.01)

(52) U.S. Cl.
CPC ............ *C02F 1/281* (2013.01); *B01J 20/041* (2013.01); *B01J 20/28059* (2013.01); *B01J 20/28071* (2013.01); *B01J 20/28083* (2013.01); *B01J 2220/42* (2013.01); *C02F 2101/20* (2013.01); *C02F 2101/308* (2013.01)

(58) Field of Classification Search
None
See application file for complete search history.

(56) References Cited

FOREIGN PATENT DOCUMENTS

| CN | 111453804 B | 6/2022 |
|---|---|---|
| CN | 115382505 A | 11/2022 |
| KR | 10-0525465 B1 | 11/2005 |

OTHER PUBLICATIONS

Eliane V. Rosa, et al., Carbon nitride nanosheets magnetically decorated with Fe3O4 nanoparticles by homogeneous precipitation: Adsorption-photocatalytic performance and acute toxicity assessment, Env. Nanotech., Monitoring & Management, vol. 16 (2021), 100549 (Year: 2021).*
Malik et al., An Overview on Magnetic Separable Spinel as a Promising Materials for Photocatalysis and Waste Water Treatment, ES Energy & Environment, vol. 19, 2023 (Year: 2023).*
M. Z. Salmasi, et al., Spinel MgAl2O4 nanospheres coupled with modified graphitic carbon nitride nanosheets as an efficient Z-scheme photocatalyst for photodegradation of organic contaminants, Applied Surface Science, vol. 585 (2022), 152615 (Year: 2022).*

(Continued)

*Primary Examiner* — Bobby Ramdhanie
(74) *Attorney, Agent, or Firm* — Oblon, McClelland, Maier & Neustadt, L.L.P.

(57) ABSTRACT

A method of removing a contaminant from water may include contacting contaminated water, including an organic pollutant, with a nanocomposite including graphitic $C_3N_4$, $Fe_2O_3$, and $MgAl_2O_4$ in a mass relationship to each other in a range of from 5 to 15:2 to 7:75 to 95, thereby adsorbing the organic pollutant onto the nanocomposite, as an adsorbed material. The method may further include removing the adsorbed material from the contaminated water, thereby reducing a concentration of the heavy metal in the contaminated water by at least 2 percent by weight (wt. %), and the organic pollutant includes a dye.

18 Claims, 6 Drawing Sheets

(56) References Cited

OTHER PUBLICATIONS

M. I. A. Abdel Maksoud, et al., "Engineered magnetic oxides nanoparticles as efficient sorbents for wastewater remediation: A review", Environmental Chemistry Letters, vol. 20, 2022, pp. 519-562 (44 pages).

Sangbin Lee, et al., "Hematite/graphitic carbon nitride nanofilm for Fenton and photocatalytic oxidation of methylene blue", Sustainability, 2020, vol. 12 (15 pages).

* cited by examiner

NANOCOMPOSITE FOR WATER DECONTAMINATION

BACKGROUND

Technical Field

The present disclosure is directed towards water decontamination techniques, and more particularly, relates to a method of removing contaminants from water using a nanocomposite including graphitic $C_3N_4$, $Fe_2O_3$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The presence of both inorganic and organic pollutants in environmental systems has resulted in serious harm, often leading to disastrous consequences. Heavy metal ions are among the most concerning pollutants due to their high toxicity, carcinogenic nature, and non-biodegradable characteristics of heavy metal ions. Currently, certain water bodies are significantly contaminated by heavy metals, which primarily result from anthropogenic activities, including chemical, textile, leather, plastic, mining, battery, paint and pigment, and paper and pulp industries. Common heavy metals found in industrial wastewater include but are not limited to, cadmium (Cd), chromium (Cr), copper (Cu), iron (Fe), lead (Pb), nickel (Ni), silver (Ag), zinc (Zn), and uranium (U). Among these, Cu is particularly prevalent in wastewater due to its extensive use in various engineering applications such as metal finishing, electroplating, and etching. Discharging the aforementioned toxic metals into water streams and effluents without adequate treatment poses a severe threat to biotic systems. Through the food chain, heavy metals may accumulate in living organisms, potentially leading to severe health conditions such as cancer, nervous system damage, and kidney failure, and may ultimately be fatal at high concentrations. In response to this growing concern, various remediation techniques, such as ion exchange, precipitation, coagulation, membrane filtration, reverse osmosis, and adsorption, have been employed to remove toxic metal ions. Among these methods, adsorption is highly favored due to its high removal efficiency, cost-effectiveness, and ability to target trace amounts of ions.

Graphite-phase carbon nitride ($g$-$C_3N_4$) has recently gained attention as a promising material for heavy metal removal due to certain desirable properties, including cost-effectiveness, metal-free n-type semiconductor nature, chemical and thermal stability, visible light responsiveness, and ease of preparation, as described by Singh and coworkers in *J. Water Proc. Eng.* 2014, 4, 233-241, which is incorporated by reference herein. However, $g$-$C_3N_4$ exhibits several drawbacks, such as low specific surface area, rapid electron-hole recombination, and challenging exfoliation. To overcome the above-listed limitations, emphasis has been placed on modifying the microstructure and incorporating heteroatom doping. Infusing $g$-$C_3N_4$ nanosheets with metal nanoparticles may prevent the aggregation of $g$-$C_3N_4$ sheets, thereby enhancing the specific surface area and adsorption capacity. Various composites such as $MgY_2O_4$-$g$-$C_3N_4$, $Ox$-$g$-$C_3N_4$/Pani-NF, and $CoFe_2O_4$-$g$-$C_3N_4$ have been utilized for the removal of copper ions, whereas cadmium ion removal has been achieved using composites like $CdS$/$g$-$C_3N_4$, $Y_2O_3$@$g$-$C_3N_4$, and $ZnO$-$g$-$C_3N_4$. Furthermore, several studies have reported that incorporating metal oxides can enhance the pore volume and average pore size of the material, further improving adsorption efficiency, as described by Sharma and coworkers in *Mater. Res. Innov.* 2022, 26(2), 65-75, and Li and coworkers in *J. Mater. Chem.* 2021, 9(26), 15019-15026, each of which is incorporated by reference herein.

Despite the above-suggested advancements, existing methods for heavy metal removal exhibit several limitations, including high operational costs, complex processing requirements, secondary waste generation, and limited efficiency at high concentrations of contaminants. Therefore, there is a requirement for the development of advanced materials and techniques that may offer enhanced adsorption capabilities, improved reusability, and environmental sustainability.

Accordingly, one object of the present disclosure is to provide a method of water decontamination using carbon nanomaterials that may circumvent the above-specified drawbacks and limitations of the methods known in the art.

SUMMARY

In an exemplary embodiment, a method of removing a contaminant from water is described. The method includes contacting contaminated water, including an organic pollutant, with a nanocomposite including graphitic $C_3N_4$, $Fe_2O_3$, and $MgAl_2O_4$ in a mass relationship to each other in a range of from 5 to 15:2 to 7:75 to 95, thereby adsorbing the organic pollutant onto the nanocomposite, as an adsorbed material. The method further includes removing the adsorbed material from the contaminated water, thereby reducing a concentration of the heavy metal in the contaminated water by at least 2 percent by weight (wt. %), and the organic pollutant includes a dye.

The average pore distribution of the nanocomposite may be unimodal, a Brunauer-Emmett-Teller (BET) specific surface area of the nanocomposite may be in a range of 15 m²/g to 45 m²/g (23.88±2.5, 2, 1.5, 1, 0.75, 0.67, 0.5, 0.33, 0.25, 0.125, 0.1, 0.05, or 0.01 m²/g), and/or an average pore diameter of the nanocomposite, according to Barrett-Joyner-Halenda (BJH) measurement method, may be in a range of 6.3 nanometer (nm) to 10.03 nm (8.3±1, 0.75, 0.67, 0.5, 0.33, 0.25, 0.125, 0.1, 0.05, or 0.01 nm), with a second average pore diameter of the second mode of the nanocomposite, according to BJH measurement method, being in a range of from 7.5 nm to 13 nm (10.87±2, 1.5, 1, 0.75, 0.67, 0.5, 0.33, 0.25, 0.125, 0.1, 0.05, or 0.01 nm), and/or an average pore volume of the nanocomposite, according to the BJH measurement method, is in a range of from 0.06 cm³/g to 0.12 cm³/g (0.09±0.03, 0.02, 0.015, 0.01, 0.0075, 0.005, 0.0025, or 0.001 cm³/g).

The nanocomposite has a (311) spinel interplanar spacing in a range of from 0.210 to 0.290 nm (0.25±0.03, 0.02, 0.015, 0.01, 0.0075, 0.005, 0.0025, or 0.001 nm), a (006) $Fe_2O_3$ interplanar spacing in a range of from 0.180 to 0.260 nm (0.22±0.03, 0.02, 0.015, 0.01, 0.0075, 0.005, 0.0025, or 0.001 nm), a (400) spinel interplanar spacing in a range of from 0.140 to 0.220 nm (0.18±0.03, 0.02, 0.015, 0.01, 0.0075, 0.005, 0.0025, or 0.001 nm), a (220) MgO interplanar spacing in a range of from 0.108 to 0.188 (0.148±0.03, 0.02, 0.015, 0.01, 0.0075, 0.005, 0.0025, or 0.001 nm), a (620) spinel interplanar spacing in a range of from 0.090 to 0.170 (0.13±0.03, 0.02, 0.015, 0.01, 0.0075, 0.005, 0.0025, or 0.001 nm), and a (119) $Fe_2O_3$ and (622) $Fe_2O_3$ spinel interplanar spacing in a range of from 0.080 to 0.160 (0.12±0.03, 0.02, 0.015, 0.01, 0.0075, 0.005, 0.0025, or 0.001 nm), according to selected area diffraction (SAED).

The mass relationship of the nanocomposite may be in a range of from 9 to 11:4 to 6:84 to 86. The nanocomposite may have a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and/or a (119) $Fe_2O_3$ and (622) $Fe_2O_3$ spinel interplanar spacing of 0.12±2% nm. An XRD spectrum of the nanocomposite under Cu-filtered CuKα radiation (1.5418 Å) powered at 45 kV and 10 mA has 20 peaks of an $MgAl_2O_4$ spinel phase at 18.9±1, 31.7±1, 44.8±1, 56.2±1, 74.09±1, and/or 78.1±1°, an MgO cubic phase at 42.8±1, 62.2±1, and/or 74.6±1°, an $Fe_2O_3$ hexagonal phase at 36.9±1, 44.8±1, 59.6±1, and/or 67.3±1°, and/or g-$C_3N_4$-related diffractions at 27.8±1, 36.8±1, 44.6±1, and/or 67.3±1°. There may be no more than 1, 0.5, 0.1, 0.01, 0.001, 0.0001, or 0.00001% relative intensity $MgFe_2O_4$ (e.g., none) detected in the XRD spectrum.

The organic pollutant may be adsorbed and includes an indolinone sulfonate substructure (indigo carmine) in a mass ratio of 0.01 to 0.2 parts (0.0982) parts of the organic molecules per part of the nanocomposite.

The carbon materials in the nanocomposite may include no more than inevitable traces nanotubes, relative to total nanocomposite weight.

The nanocomposite may include no more than 1 wt. % of carbonaceous materials besides graphitic $C_3N_4$.

Inventive methods may employ no $H_2O_2$, $O_3$, and/or peroxide.

The nanocomposite may include no more than 1 wt. % elemental state Fe, relative to total nanocomposite weight.

The nanocomposite may include no more than 1 wt. % elemental state metal, relative to total nanocomposite weight.

The nanocomposite may include no more than 1 wt. % Fe—N, relative to total nanocomposite weight.

The nanocomposite may include no more than inevitable traces of mercaptan, amine, and/or carboxylic acid functional groups, e.g., o more than 5, 4, 3, 2.5, 2, 1, 0.5, 0.1, 0.01, 0.001, 0.0001, or 0.00001 eq. per 100 eq. $Fe_2O_3$, individually or in any combination, of mercaptan, amine, and/or carboxylic acid functional groups.

Inventive methods may avoid or use no silane in making the nanocomposite, and/or the nanocomposite may include no more than inevitable traces of silyl functions.

Relative to a total metal oxide weight, the nanocomposite may include no more than 10, 7.5, 5, 4, 3, 2, 1, 0.5, 0.1, 0.01, 0.001, 0.0001, or 0.00001 wt. % MgO, and/or no more than 1, 0.5, 0.1, 0.01, 0.001, 0.0001, or 0.00001 wt. % $ZrO_2$.

The nanocomposite may include no more than 10, 7.5, 5, 4, 3, 2, 1, 0.1, 0.01, 0.001, 0.0001, or 0.00001 wt. %, individually or in any combination, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and/or $LaFeO_3$.

The nanocomposite may include no more than 10, 7.5, 5, 4, 3, 2, 1, 0.5, 0.1, 0.01, 0.001, 0.0001, or 0.00001 wt. %, individually or in in any combination, relative to total metal content, of any of Zn, Ce, Gd, La, Ba, Ti, Ca, Sr, Zr, Pb, Ni, Ag, Co, Cu, Mn, Cd, Ta, Nb, Pr, and/or Bi. The nanocomposite may include no more than 1, 0.75, 0.67, 0.5, 0.33, 0.25, 0.125, 0.1, 0.05, 0.1, 0.01, 0.001, 0.0001, or 0.00001 wt. %, individually or in any combination, relative to total carrier weight, of $SiO_2$, $TiO_2$, ZnO, and/or ZnS.

The adsorbent may include a nanocomposite including graphitic $C_3N_4$, $Fe_2O_3$, and $MgAl_2O_4$ in a mass relationship to each other in a range of from 5 to 15:2 to 7:75 to 95, while tolerable variations of any of these values may be ±2.5, 2, 1.5, 1, 0.75, 0.5, 0.25, 0.1, 0.5, or 0.1. The nanocomposite may adsorb a contaminant including an organic pollutant onto the nanocomposite, e.g., no other type of contaminant or in addition to others. The nanocomposite may have a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and/or a (119) $Fe_2O_3$ and (622) $Fe_2O_3$ spinel interplanar spacing of 0.12±2% nm. An XRD spectrum of the nanocomposite under Cu-filtered Cu-Kα radiation (1.5418 Å) powered at 45 kV and 10 mA may have 20 peaks of an $MgAl_2O_4$ spinel phase at 18.9±1°, 31.7±1°, 44.8±1°, 56.2±1°, 74.09±1°, and/or 78.1±1°, an MgO cubic phase at 42.8±1°, 62.2±1°, and/or 74.6±1°, an $Fe_2O_3$ hexagonal phase at 36.9±1°, 44.8±1°, 59.6±1°, and/or 67.3±1°, and/or g-$C_3N_4$-related diffractions at 27.8±1°, 36.8±1°, 44.6±1°, and/or 67.3±1°. There may be no more than 1, 0.9, 0.75, 0.5, 0.25, 0.1, 0.05, or 0.01% relative intensity $MgFe_2O_4$ (or none) detected in the XRD spectrum. The nanocomposite may have a BET specific surface area in a range of from 15 to 45 $m^2$/g.

The nanocomposite may have a first average pore diameter of the first mode of the nanocomposite, according to BJH measurement method, in a range of from 6.3 nm to 10.03 nm, with a second average pore diameter of the second mode of the nanocomposite, according to BJH measurement method, in a range of from 7.5 to 13 nm. An average pore volume, according to the BJH measurement method, may be in a range of from 0.06 to 0.12 $cm^3$/g.

The BET specific surface area of the nanocomposite may be 23.88±2 $m^2$/g, and the first average pore diameter of the first mode of the nanocomposite, according to BJH measurement method, may be 8.3±1 nm, the second average pore diameter of the second mode of the nanocomposite, according to BJH measurement method, may be 10.87±1 nm, and the average pore volume of the nanocomposite, according to the BJH measurement method, may be 0.09±0.005 $cm^3$/g.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3$/g) and is an important parameter in characterizing the porous structure of materials, such as adsorbents or catalysts.

As used herein, the term 'photodegradation' refers to the process by which a material undergoes chemical breakdown or alteration due to exposure to light. This process typically results in the breaking of molecular bonds within the material, leading to the formation of new compounds or the degradation of its physical and chemical properties.

As used herein, the term 'contaminants' refer to the harmful substances or contaminants that degrade the quality of water, air, soil, or food, making them unsafe or unsuitable for specific uses. In water, contaminants include biological agents like bacteria, viruses, and parasites; chemical substances such as heavy metals, pesticides, pharmaceuticals, and industrial chemicals; and physical materials like dirt, debris, and sediment. These contaminants can pose serious risks to human health, the environment, and ecosystems, depending on their type, concentration, and exposure levels.

As used herein, the term 'organic contaminants' refers to carbon-based compounds, typically derived from industrial, agricultural, or domestic activities, that are present as contaminants in water or the environment. These contaminants may include pesticides, pharmaceuticals, dyes, and other synthetic or natural organic substances that can pose environmental or health risks.

The organic contaminant may be a dye, a phenol, a polycyclic aromatic hydrocarbon, an herbicide, a pesticide, a persistent organic contaminant, or the like.

The organic contaminant may be a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

An herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Contaminants. Examples of persistent organic contaminants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane ($\alpha$- and $\beta$-), hexabromodiphenyl ether, lindane, pentachlorobenzene, tetrabromodiphenyl ether, perfluorooctanesulfonic acid, endosulfans, and hexabromocyclododecane.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

As used herein, the term 'spinel interplanar spacing' refers to the distance between parallel planes of atoms in the crystal structure of a spinel material. Spinel is a type of mineral with a specific crystalline arrangement, represented by the general formula $AB_2O_4$, where 'A' and 'B' are metal ions. The interplanar spacing is crucial for understanding the material's structural properties and is typically measured using X-ray diffraction (XRD) techniques.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure is directed to a method of forming a nanocomposite of graphitic carbon nitride (g-$C_3N_4$), iron oxide ($Fe_2O_3$), and magnesium aluminate ($MgAl_2O_4$) (g-$C_3N_4$@$Fe_2O_3$/$MgAl_2O_4$). Each component of the nanocomposite, when used in appropriate ratios, is effective in the removal of organic contaminants in water with high efficiency and removal activity.

A nanocomposite (g-$C_3N_4$@$Fe_2O_3$/$MgAl_2O_4$) including g-$C_3N_4$, $Fe_2O_3$, and $MgAl_2O_4$ is described. The nanocomposite includes coating of g-$C_3N_4$ on $Fe_2O_3$ and $MgAl_2O_4$. The g-$C_3N_4$, $Fe_2O_3$, and $MgAl_2O_4$ are present in the nanocomposite in a mass relationship to each other in a range of from 5 to 15:2 to 7:75 to 95, preferably 7 to 13:3 to 6:80 to 90, and preferably 9 to 11:4 to 5:84 to 86. In a preferred embodiment, g-$C_3N_4$, $Fe_2O_3$, and $MgAl_2O_4$ are present in the nanocomposite in a mass relationship to each other of 10:5:85, while tolerable variations of any of these values may be ±2.5, 2, 1.5, 1, 0.75, 0.5, 0.25, 0.1, 0.5, or 0.1. The nanocomposite exhibits excellent performance in photodegradation of organic pollutants, hydrogen generation, and anticancer activity. The material demonstrates enhanced catalytic properties, high surface reactivity, and efficient adsorption, making it suitable for applications in environmental remediation, energy production, and biomedical treatments.

The nanocomposite may contain g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may contain 10, 7.5, 5, 4, 3, 2, 1, 0.5, 0.1, 0.01, 0.001, 0.0001, or 0.00001 wt. % of graphite-phase carbon nitride (g-$C_3N_4$).

The nanocomposite may contain $Fe_2O_3$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may contain 54, 3, 2.5, 2, 1, 0.5, 0.1, 0.01, 0.001, 0.0001, or 0.00001 wt. % of $Fe_2O_3$.

The nanocomposite may contain magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. In a preferred embodiment, the nanocomposite contains 85±5, 4, 3.33, 2.5, 2, 1.5, 1, 0.75, 0.67, 0.5, 0.33, 0.25, 0.125, 0.1, 0.05, or 0.01 wt. % of magnesium aluminum oxide ($MgAl_2O_4$).

The nanocomposite may contain no more than 1, 0.75, 0.5, 0.25, 0.1, 0.01, 0.001, 0.0001, or 0.00001 wt. %, preferably less than 0.9 wt. %, preferably less than 0.8 wt. %, preferably less than 0.7 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % of carbonaceous materials besides graphitic $C_3N_4$. A low concentration of carbonaceous material may contribute to maintaining the desired structural integrity and functional properties of the nanocomposite. The minimal amount of additional carbon material may prevent any significant interference with the performance of the graphitic carbon nitride, particularly in applications such as photocatalysis or energy storage, where the purity and specific properties of the g-$C_3N_4$ are crucial.

The nanocomposite may contain no more than 1, 0.75, 0.5, 0.25, 0.1, 0.01, 0.001, 0.0001, or 0.00001 wt. %, preferably less than 0.9 wt. %, preferably less than 0.8 wt. %, preferably 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, preferably less than 0.01 wt. % inevitable traces nanotubes, relative to total nanocomposite weight.

The nanocomposite may contain no more than 1, 0.75, 0.5, 0.25, 0.1, 0.01, 0.001, 0.0001, or 0.00001 wt. % elemental state metal, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % elemental state metal, relative to total nanocomposite weight.

The nanocomposite may contain no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % elemental state Fe, relative to total nanocomposite weight.

The nanocomposite may contain no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % Fe—N, relative to total nanocomposite weight.

The nanocomposite may contain no more 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % inevitable traces of a mercaptan, amine, and/or carboxylic acid functional groups.

The nanocomposite may contain no more than 10, 7.5, 5, 4, 3, 2, 1, 0.75, 0.5, 0.25, 0.1, 0.01, 0.001, 0.0001, or 0.00001 wt. % MgO, preferably no more than 9 wt. % MgO, preferably no more than 8 wt. % MgO, preferably no more than 7 wt. % MgO, preferably no more than 6 wt. % MgO, preferably no more than 5 wt. % MgO, preferably no more than 4 wt. % MgO, preferably no more than 3 wt. % MgO preferably no more than 2 wt. % MgO, and preferably no more than 1 wt. % MgO, relative to a total metal oxide weight.

The nanocomposite may contain no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % $ZrO_2$, relative to a total metal oxide weight.

The nanocomposite may contain no more than 10, 7.5, 5, 4, 3, 2, 1, 0.75, 0.5, 0.25, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.5 wt. %, and preferably no more than 0.1 wt. %, individually or in any combination, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.0, 0.6, 1.0), Ag, $CoFe_2O_4$, $CuFe_2O_4$, $MnFe_2O_4$, $NiFe_2O_4$, $ZnFe_2O_4$, $Cu_{1-x}Cd_xFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}$ (Co, Ni, Zn)$_{0.7}Fe_2O_4$, $LaCo_{0.5}Fe_{0.5}O_3$, $Mg_{0.1}$—$Co_{0.9}Fe_2O_4$, $La_{1-x}Gd_xCr_{1-y}Ni_yO_3$, $Gd_2FeCrO_6$, $KTaO_3$, $NaTaO_3$, $NaNbO_3$, $KNbO_3$, $Mg_{1-x}Ni_xFe_2O_4$, $Cu_{0.5}Cd_{0.25}Co_{0.25}Fe_{2-x}O_4$, $Zn_{0.5}Co_{0.5}La_xFe_{2-x}O_4$, $Pr_2Ti_2O_7$, $SiO_2$, $TiO_2$, ZnO, ZnS, $Bi_4O_5I_2$, $SrFe_{0.5}Ta_{0.5}O_3$, $La_{0.8}Ba_{0.2}TiO_{3.5-\delta}$, $LaTiO_{3.5-\delta}$, $NaNbO_3$, and/or $LaFeO_3$, relative to a total metal oxide weight.

The nanocomposite may contain no more than 10, 7.5, 5, 4, 3, 2, 1, 0.75, 0.5, 0.25, 0.1, 0.01, 0.001, 0.0001, or 0.00001 wt. %, preferably no more than 9 wt. %, preferably no more than 8 wt. %, preferably no more than 7 wt. %, preferably no more than 6 wt. %, preferably no more than 5 wt. %, preferably no more than 4 wt. %, preferably no more than 3 wt. %, preferably no more than 2 wt. %, preferably no more than 1 wt. %, preferably no more than 0.5 wt. %, and preferably no more than 0.1 wt. % (for example, elemental, i.e., zero oxidation state) metal content, relative to total metal content. The metal may exclude or include Zn, Ce, Gd, La, Ba, Ti, Ca, Sr, Zr, Pb, Ni, Ag, Co, Cu, Mn, Cd, Ta, Nb, Pr, and/or Bi. Excessive metal accumulation could negatively impact the nanocomposite's stability, reactivity, or selectivity. By limiting the metal content, the nanocomposite maintains a high level of performance in its intended applications, ensuring that the active sites of the carrier material remain unblocked or inhibited, thus enhancing its long-term durability, minimizing unwanted side reactions, and preserving its efficiency in processes like catalysis or energy conversion.

The nanocomposite may contain no more than 1, 0.75, 0.5, 0.25, 0.1, 0.01, 0.001, 0.0001, or 0.00001 wt. %, preferably no more than 0.9 wt. %, preferably no more than 0.8 wt. %, preferably no more than 0.7 wt. %, preferably no more than 0.6 wt. %, preferably no more than 0.5 wt. %, preferably no more than 0.4 wt. %, preferably no more than 0.3 wt. %, preferably no more than 0.2 wt. %, preferably no more than 0.1 wt. %, preferably no more than 0.05 wt. %, and preferably no more than 0.01 wt. % $SiO_2$, $TiO_2$, ZnO, and/or ZnS, individually or in any combination.

The minimal presence or absence of each of these elements/compounds, in aforementioned embodiments, in the nanocomposite ensures desired performance in environmental remediation, energy production, and biomedical applications, free from interference by other phases in the nanocomposite.

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

The Brunauer-Emmett-Teller (BET) surface area of the nanocomposite may be in a range of from 15 to 45 square meters per gram ($m^2/g$), preferably 20 to 35 $m^2/g$, and preferably 40±5, 4, 3.33, 2.5, 2, 1.5, 1, 0.75, 0.67, 0.5, 0.33, 0.25, 0.125, 0.1, 0.05, or 0.01 $m^2/g$. The surface area on the nanocomposite is 23.88±5, 4, 3.33, 2.5, 2, 1.5, 1, 0.75, 0.67, 0.5, 0.33, 0.25, 0.125, 0.1, 0.05, or 0.01 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. The pore diameter, pore volume, and/or BET surface area may be measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

The first average pore diameter of the nanocomposite, according to Barrett-Joyner-Halenda (BJH) measurement method, may be in a range of from 6.3 to 10.3 nm, preferably 6.5 to 9.5 nm, preferably 7 to 9 nm, preferably 8 to 10 nm, and preferably 9 to 10 nm. The nanocomposite may have the first average pore diameter of 8.3±1.5, 1, 0.75, 0.67, 0.5, 0.33, 0.25, 0.125, 0.1, 0.05, or 0.01 nm.

The second average pore diameter of the nanocomposite, according to Barrett-Joyner-Halenda (BJH) measurement method, may be in a range of from 7.5 to 13 nm, preferably 8.5 to 10.5 nm, preferably 7 to 10 nm, preferably 8 to 11 nm, and preferably 9 to 12 nm. The nanocomposite may have a second average pore diameter of 10.87±2, 1.5, 1, 0.75, 0.67, 0.5, 0.33, 0.25, 0.125, 0.1, 0.05, or 0.01 nm.

The average pore volume of the nanocomposite, according to the BJH measurement method, may be in a range of from 0.06 to 0.12 $cm^3/g$, preferably 0.07 to 0.09 $cm^3/g$, preferably 0.08 to 0.10 $cm^3/g$, and preferably 0.09 to 0.12 $cm^3/g$. In a preferred embodiment, the average pore volume of the nanocomposite 0.09±0.025, 0.01, 0.005, or 0.001 $cm^3/g$.

The mass relationship of the nanocomposite may be in a range of from 9 to 11:4 to 6:84 to 86, and preferably 9.5 to 10.5:4.5 to 5.5:84.5 to 85.5. The mass relationship of the nanocomposite may be 10:5:85, while tolerable variations of any of these values may be ±2.5, 2, 1.5, 1, 0.75, 0.5, 0.25, 0.1, 0.5, or 0.1.

The nanocomposite may have a (311) spinel interplanar spacing in a range of from 0.210 to 0.290 nm, preferably 0.220 to 0.255 nm, preferably 0.235 to 0.270 nm, and preferably 0.265 to 0.290 nm, a (006) $Fe_2O_3$ interplanar spacing in a range of from 0.180 to 0.260 nm, preferably 0.19 to 0.220 nm, preferably 0.200 to 0.250 nm, and preferably 0.240 to 0.260 nm; a (400) spinel interplanar spacing in a range of from 0.140 to 0.220 nm, preferably 0.140 to 0.185 nm, preferably 0.150 to 0.175 nm, and preferably 0.170 to 0.180 nm; a (220) MgO interplanar spacing in a range of from 0.108 to 0.188 nm, preferably 0.130 to 0.185 nm, preferably 0.150 to 0.175 nm, and preferably 0.170 to 0.180 nm; a (620) spinel interplanar spacing in a range of from 0.090 to 0.170 nm, preferably 0.100 to 0.165 nm, preferably 0.120 to 0.155 nm, and preferably 0.150 to 0.170 nm; and/or a (119) $Fe_2O_3$ and a (622) $Fe_2O_3$ spinel interplanar spacing in a range of from 0.080 to 0.160 nm, preferably 0.110 to 0.145 nm, preferably 0.120 to 0.155 nm, and preferably 0.150 to 0.160 nm, according to SAED.

The nanocomposite may have a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm, according to selected area diffraction.

The XRD spectrum of the nanocomposite under Cu-filtered Cu-Kα radiation (1.5418 Å) powered at 45 kilovolt (kV) and 10 milliampere (mA) may have 2θ peaks of a $MgAl_2O_4$ spinel phase at 18.9±1, 31.7±1, 44.8±1, 56.2±1, 74.09±1, and/or 78.1±1°, a MgO cubic phase at 42.8±1, 62.2±1, and/or 74.6±1°, a $Fe_2O_3$ hexagonal phase at 36.9±1, 44.8±1, 59.6±1, and/or 67.3±1°, and/or g-$C_3N_4$-related diffractions at 27.8±1, 36.8±1, 44.6±1, and/or 67.3±1°. Three may be no more than 1% relative intensity $MgFe_2O_4$ (or none) detected in the XRD spectrum. The $MgAl_2O_4$ spinel is represented by diffractions at 2θ values of 18.9, 31.7, 44.8, 56.2, 74.09, and/or 78.1°. At 2θ values of 42.8, 62.2, and/or 74.6°, the cubic phase of MgO the detected. At 2θ values of 36.9, 44.8, 59.6, and/or 67.3°, the hexagonal phase of $Fe_2O_3$ may be detected. At 2θ values of 27.8, 36.8, 44.6, and/or 67.3° g-$C_3N_4$-related diffractions may be detected.

$MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter ($g/cm^3$)), high thermal shock resistance, hydrophobicity, and low surface acidity.

The nanocomposite may consist essentially of sheet morphologies, preferably nanosheets (i.e., such that no more than 5% reduction of the rate of adsorption of carmine dyes, in the first 30 minutes of contact is lost), although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible. The nanocomposite may have a structure including a dispersion of homogeneous spherical metal oxides nanoparticles on a two-dimensional porous structure including curled and wrinkled nanosheets and platelets of the g-$C_3N_4$. No silane may be used in making the nanocomposite, for example, no more than 5, 4, 3, 2.5, 2, 1, 0.5, 0.1, 0.01, 0.001, 0.0001, or 0.00001 silyl equivalent per 1 mg of nanocomposite. The nanocomposite may include no more than inevitable traces of silyl functions.

Figure 1:
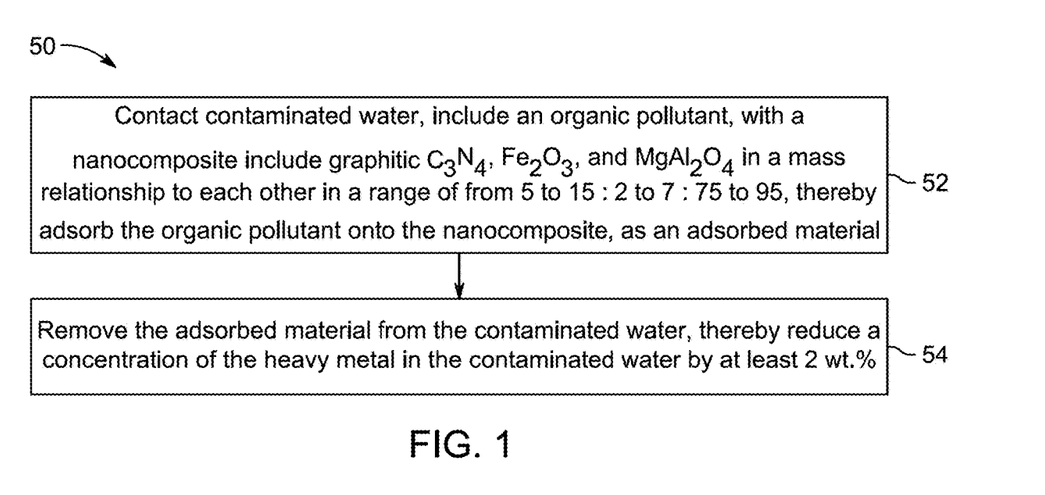
FIG. 1 is an exemplary flow chart of an inventive method of removing a contaminant from water.

Referring to FIG. 1, a method 50 for removing contaminants from water is described. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes contacting contaminated water, including a heavy metal and/or an organic pollutant, with the nanocomposite, thereby adsorbing the heavy metal and/or the organic pollutant onto the nanocomposite, as an adsorbed material. This interaction facilitates the adsorption of heavy metals and/or organic pollutants onto the nanocomposite. The nanocomposite preferentially adsorbs charged indigo-derivative dyes to radioactive metals. The nanocomposite adsorbs organic dyes as the organic pollutant. The organic pollutant may be a dye, a phenol, a polycyclic aromatic hydrocarbon, an herbicide, a pesticide, a persistent organic contaminant, or the like. The dye may be an indigo carmine dye. The method may use or include no $H_2O_2$ and/or no $O_3$. The method may include no peroxide, additionally or alternatively.

The organic pollutant adsorbed may include an indolinone sulfonate substructure (e.g., indigo carmine) in a mass ratio of 0.01 to 0.2 parts, preferably 0.05 parts, preferably 0.1 parts, preferably 0.15 parts, preferably 0.2 parts, of the organic molecules per part of the nanocomposite. The organic pollutant adsorbed may include an indolinone sulfonate substructure (e.g., indigo carmine) in a mass ratio of 0.0982 parts of the organic molecules per part of the nanocomposite. In some embodiment, at least 70 mg, preferably at least 75, at least 80 mg, at least 85 mg, at least 90 mg, at least 95 mg of the organic pollutant is adsorbed per gram of nanocomposite within 30 minutes of the contacting the organic pollutant with the nanocomposite. About 98.2±5, 4, 3.33, 2.5, 2, 1.5, 1, 0.75, 0.67, 0.5, 0.33, 0.25, 0.125, 0.1, 0.05, or 0.01 mg per gram of nanocomposite is adsorbed from the water within 30 minutes of contacting the organic pollutant with the nanocomposite.

At step 54, the method 50 includes removing the adsorbed material from the contaminated water, thereby reducing the concentration of the heavy metal in the contaminated water by at least 2 wt. %. The adsorbed materials are separated from the contaminated water and reducing the concentration of the heavy metal in the contaminated water by at least 2 wt. %, preferably at least 2.5 wt. %, preferably at least 3 wt. %, preferably at least 3.5 wt. %, preferably at least 4 wt. %, preferably at least 5 wt. %.

The following examples are provided solely for illustration and are not to be construed as limitations of the present disclosure, as many variations thereof are possible without departing from the spirit and scope of the present disclosure.

EXAMPLES

The following examples demonstrate a method of removing contaminants from water. The examples are provided solely for illustration and are not to be construed as limitations of the present disclosure, as many variations thereof are possible without departing from the spirit and scope of the present disclosure.

Example 1: Fabrication of g-$C_3N_4$@$Fe_2O_3$/$MgAl_2O_4$ (10:5:85, wt. %) nanocomposite According to the present disclosure, magnesium nitrate and aluminum nitrate were added together in one beaker with ferric nitrate in a predetermined amount (here, stoichiometric) to produce a 10% $Fe_2O_3$@$MgAl_2O_4$ nanocomposite. Further, about 10 grams (g) of methanol as a fuel was added to the beaker, followed by 30 milliliters (mL) of distilled water. The beaker was heated till a clear solution was obtained and heated further till dryness. The obtained product was ground in a mortar, transferred to a 150 mL porcelain dish, and calcined at 700° C. for 3.0 hours. Furthermore, the 10% $Fe_2O_3$@$MgAl_2O_4$ product was cooled down to room temperature and weighed, ground with urea in an amount suitable (here, 2 g urea to 20 g of the 10% $Fe_2O_3$/$MgAl_2O_4$ product, but depending upon the reaction conditions, this may be 5, 10, 15, 20, 25, 33, 50, 100, 150, 250, 500, or 1000 parts by weight of urea to 100 parts by weight of 10% $Fe_2O_3$/$MgAl_2O_4$, and optionally no more than 100,000, 50,000, 25,000, 10,000, 5,000, 1,000, 750, 500, 400, 333, 250, 125, 100, 75, 50, 25, 20, 15, or 10 parts by weight urea to 100 parts) to produce g-$C_3N_4$@$Fe_2O_3$/$MgAl_2O_4$ (10:5:85, wt. %) nanocomposite. The quadruple mixture was returned and heated to 600° C. for 60 minutes in a covered porcelain crucible, and subsequently, the g-$C_3N_4$@$Fe_2O_3$/$MgAl_2O_4$ (10:5:85, wt. %) nanocomposite was collected.

Example 2: Characterization

X-ray diffraction (XRD) was used to identify the crystalline states in each specimen, employing the JDX-8030 X-ray, JEOL, made in Japan. Cu-filtered Cu-Kα radiation (1.5418 Å) powered at 45 kV and 10 mA was used to run the patterns. The specimens were tested at ambient temperatures in a range of 2θ=5° to 80°. The surface morphologies of the obtained samples were analyzed using images of transmission electron microscopy (TEM), selected area electron diffraction (SAED), and high-resolution transmission electron microscopy (HRTEM), obtained by a Tecnai-G20 (USA) transmission electron microscope with a 200 kV speed voltage.

Results and Discussion

Figure 2:
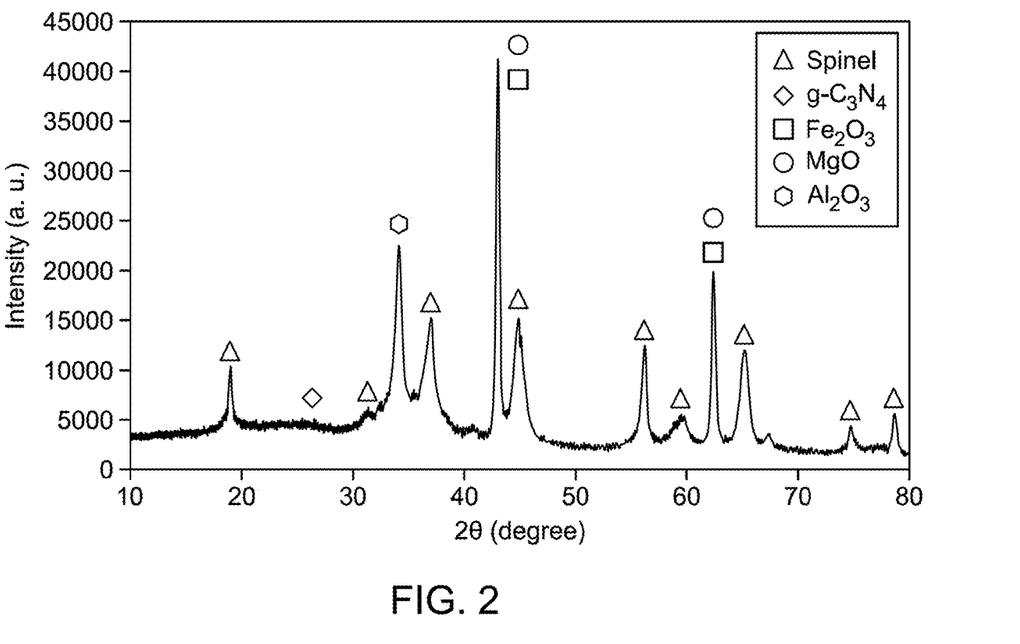
FIG. 2 is a graph depicting X-ray diffraction (XRD) patterns of an inventive 10% g-$C_3N_4$@$MnO_2$/$MgAl_2O_4$ nanocomposite.

As mentioned above, XRD was used to examine the crystallinity and phase identification of the g-$C_3N_4$@$MnO_2$/$MgAl_2O_4$ catalyst, the results of which are depicted in FIG. 2. The high crystalline nature of the nanocomposite was indicated by sharp peaks and high-intensity values, as shown in FIG. 2. $Fe_2O_3$, MgO, $MgAl_2O_4$, and g-$C_3N_4$ phases were detected when the diffraction patterns matched the typical JCPDS cards. $MgAl_2O_4$ spinel diffractions were recorded at 2θ values of 18.9°, 31.7°, 44.8°, 56.2, 74.09°, and 78.1°. The standard COD card number 9001364 states that these diffractions originated from the (111), (220), (400), (422), (620), and (622) planes, respectively. MgO (COD card, No. 9000499) showed a cubic phase at 2θ values of 42.8°, 62.2°, and 74.6°. The (200), (220), and (311), respectively, are represented by the lines mentioned above. It has also been previously observed that MgO is present along with the $MgAl_2O_4$ spinel phase. The hexagonal phase of $Fe_2O_3$ (COD No. 1532120) is closely matched with the diffraction lines seen at 36.9°, 44.8°, 59.6°, and 67.3°. The peak at 34.2° related to $Al_2O_3$. g-$C_3N_4$-related diffractions were detected at 27.8°, 36.8°, 44.6°, and 67.3° (COD No. 1534042). g-$C_3N_4$@$Fe_2O_3$/$MgAl_2O_4$ was successfully fabricated since no additional phases, such as $MgFe_2O_4$, were found. However, the computed lattice parameters for each phase were also determined and were as follows, 'a'=8.07410 Å for spinel, 'a'=4.83840 Å for $Fe_2O_3$, and 'c'=12.61127 Å for $Fe_2O_3$, 'a'=4.20729 Å for MgO, and a=6.84283 Å for g-$C_3N_4$.

Figure 3A:
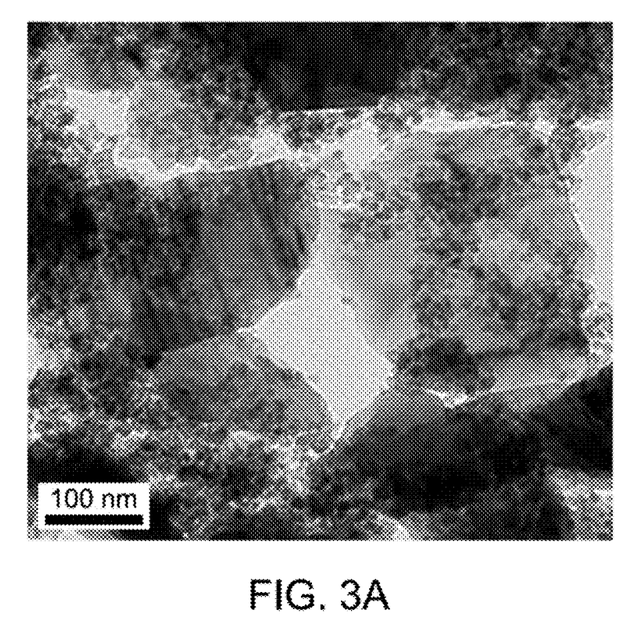
FIG. 3A is a transmission electron microscopy (TEM) image of an inventive 10% g-$C_3N_4$@$Fe_2O_3$/$MgAl_2O_4$ nanocomposite, at a magnification of 100 nanometers (nm).
Figure 3B:
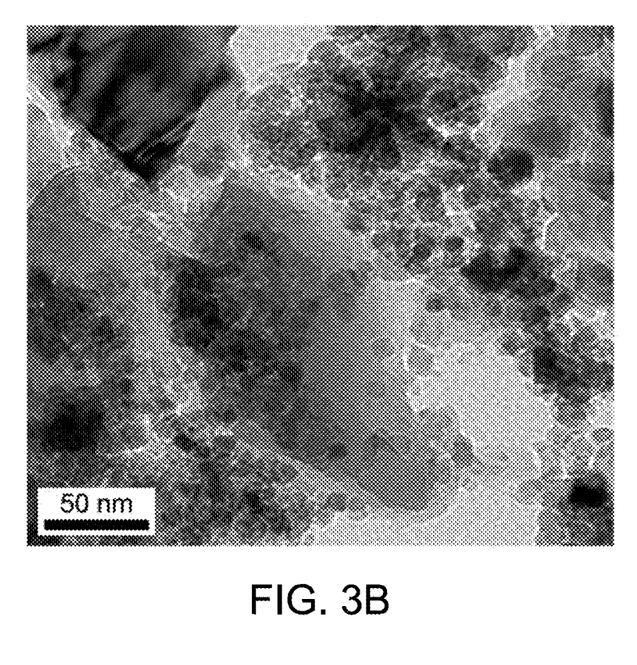
FIG. 3B is another TEM image of an inventive 10% g-$C_3N_4$@$Fe_2O_3$/$MgAl_2O_4$ nanocomposite, at a magnification of 50 nm.
Figure 3C:
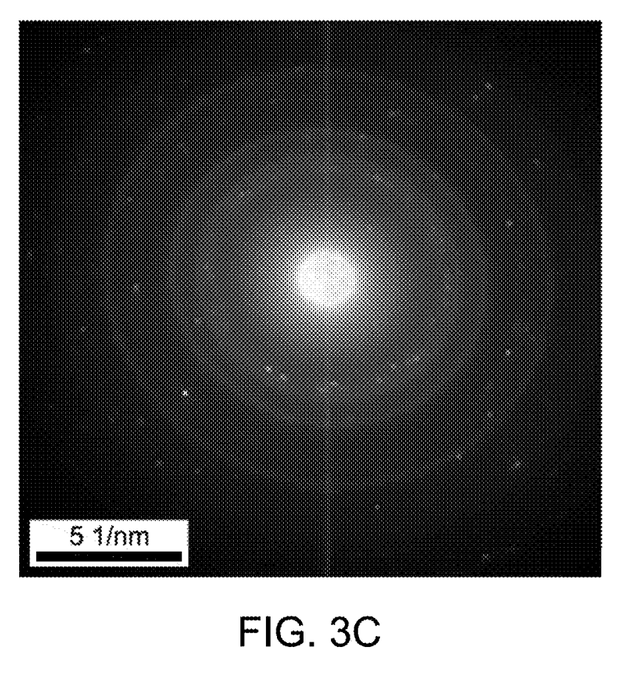
FIG. 3C is a selected area electron diffraction (SAED) pattern of an inventive 10 g-$C_3N_4$@$Fe_2O_3$/$MgAl_2O_4$ nanocomposite.
Figure 3D:
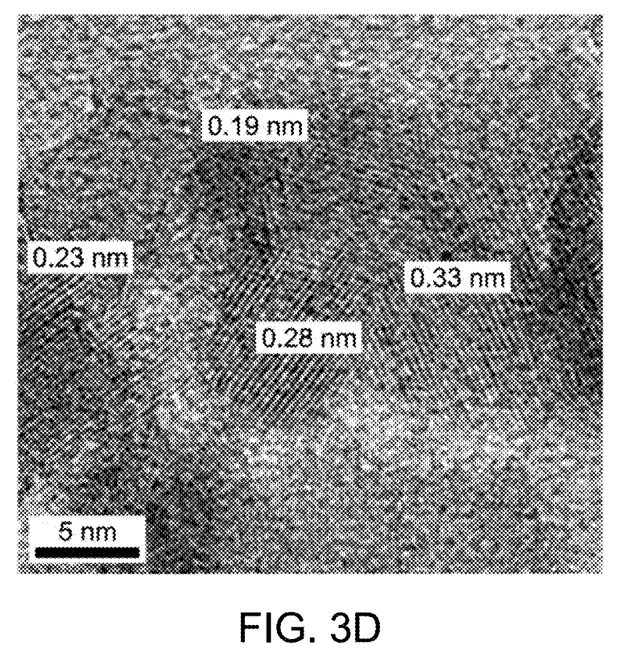
FIG. 3D is a high-resolution transmission electron microscopy (HRTEM) image of an inventive 10% g-$C_3N_4$@$Fe_2O_3$/$MgAl_2O_4$ nanocomposite.

Further, TEM images of g-$C_3N_4$@$Fe_2O_3$/$MgAl_2O_4$ nanocomposite are shown in FIGS. 3A and 3B. The TEM images showed a good dispersion of homogeneous spherical metal oxide nanoparticles with a size of 7 nm on a two-dimensional porous structure constructed with curled nanosheets and platelets of the g-$C_3N_4$. The corresponding SAED patterns, as shown in FIG. 3C, reveals diffraction spots with interplanar spacing of 0.25 nm, 0.22 nm, 0.18 nm, 0.148 nm, 0.13 nm, and 0.12 nm due to (311, spinel), (006, $Fe_2O_3$), (400, spinel), (220, MgO), (620, spinel), and 119, $Fe_2O_3$, 622, spinel diffraction planes, respectively. The corresponding HRTEM of the nanocomposite, as shown in FIG. 3D shows a plane spacing of 0.33 nm related to the (002) of CN, where 0.28 nm and 0.19 nm are related to (220) and (400) planes of spinel, and 0.24 nm related to the (110) plane of $Fe_2O_3$, characterizing the heterostructure formation.

Figure 4A:
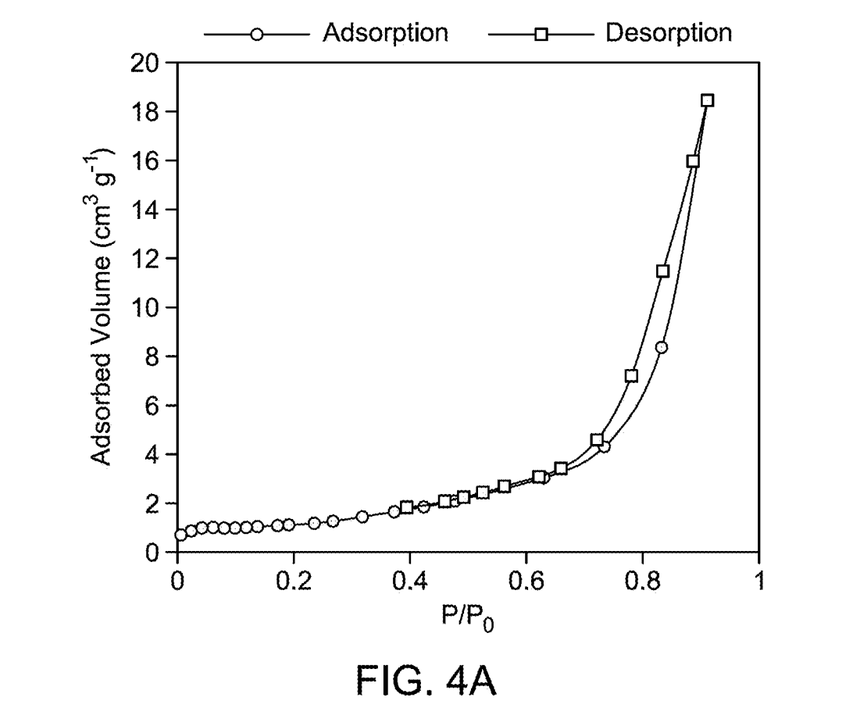
FIG. 4A is a graph depicting nitrogen adsorption-desorption isotherm of an inventive g-$C_3N_4$@$Fe_2O_3$/$MgAl_2O_4$ nanocomposite.
Figure 4B:
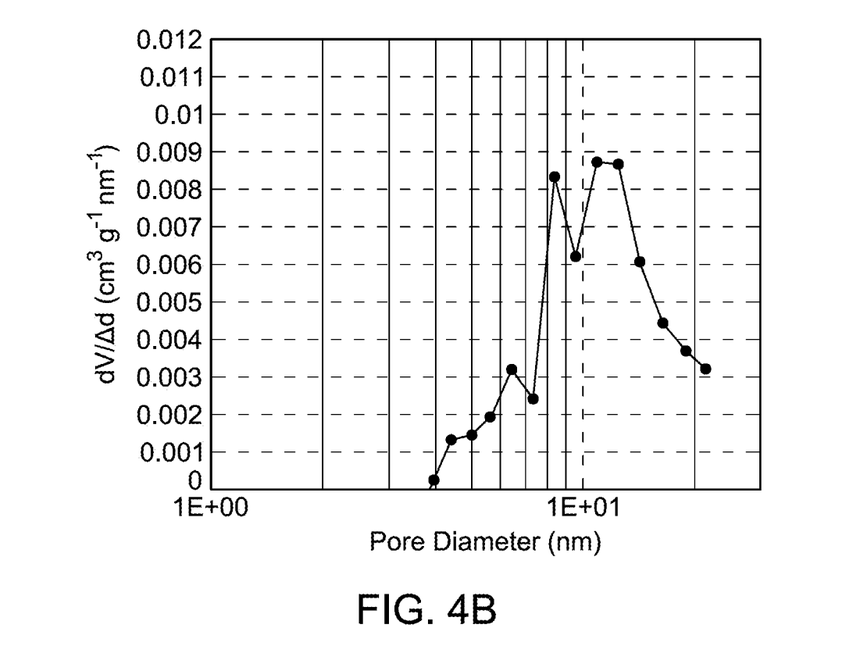
FIG. 4B is a graph depicting the pore size distribution of an inventive g-$C_3N_4$@$Fe_2O_3$/$MgAl_2O_4$ nanocomposite.

FIG. 4 displays the nitrogen adsorption-desorption isotherms of g-$C_3N_4$@$Fe_2O_3$/$MgAl_2O_4$ nanocomposite. The nitrogen sorption isotherm of the nanocomposite relates to type IV with a clear hysteresis loop, indicating the formation of mesoporous structures. However, shifting the loop to a relatively higher pressure (P/P°-0.68 to 1) suggests an increase in the size of the mesopores, which may result from the well dispersion of metal oxide particles on the nanosheets of g-$C_3N_4$. Furthermore, the BET surface area of the g-$C_3N_4$@$Fe_2O_3$/$MgAl_2O_4$ sample was calculated to be 23.88 $m^2$/g. The marked high specific surface area reflects the good dispersion of these metal oxide nanoparticles on g-$C_3N_4$. Moreover, the pore size distribution curves, plotted using the BJH method, for the g-$C_3N_4$@$Fe_2O_3$/$MgAl_2O_4$ sample exhibited bimodal distribution with average pore diameters maximized at 8.3 nm and 10.89 nm in addition to pore volume of 0.09 $cm^3$/g. All the isotherms belong to the category H3 type of pores, which do not exhibit limiting adsorption at high P/P° and arise due to aggregation of plate-like particles giving rise to slit-shaped pores. The above observation indicates that the assembly of g-$C_3N_4$@$Fe_2O_3$/$MgAl_2O_4$ composite provoked a mesoporous array.

Figure 5:
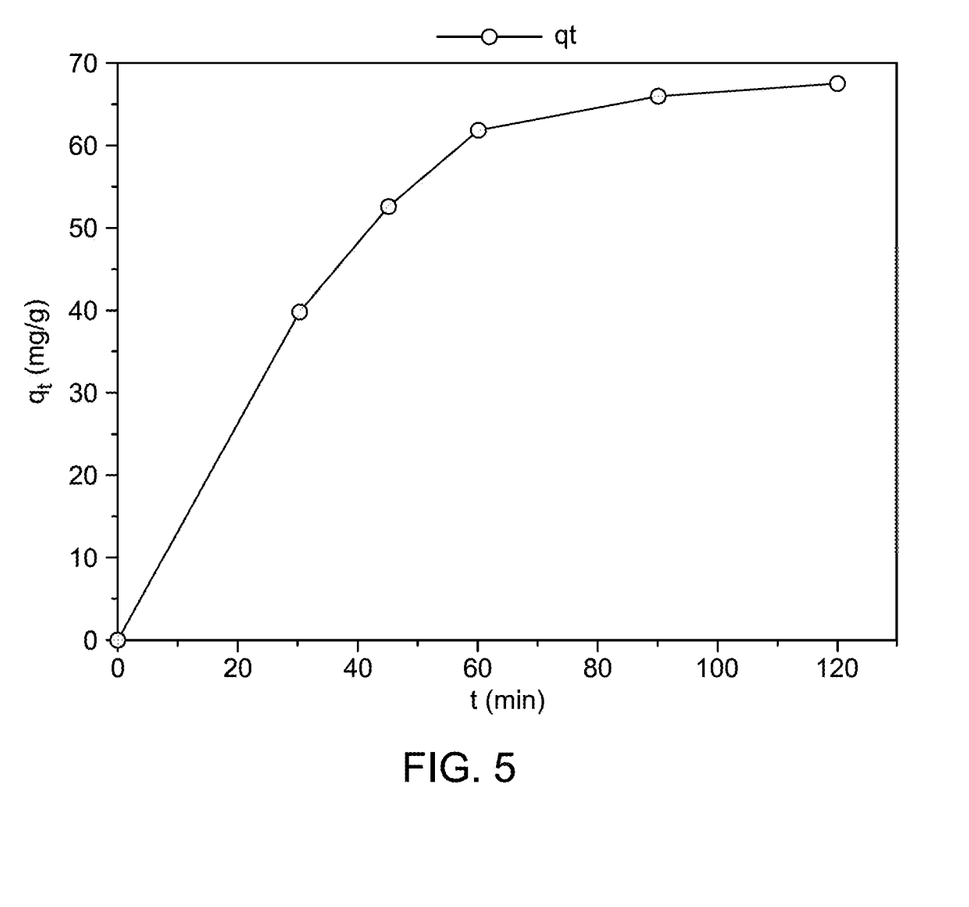
FIG. 5 is a graph depicting adsorption of indigo carmine dye from water by an inventive synthesized g-$C_3N_4$@$Fe_2O_2$/$MgAl_2O_4$ nanocomposite.

Furthermore, an accurate mass of 50 mg of the g-$C_3N_4$@$Fe_2O_3$/$MgAl_2O_4$ was transferred to a 120 mL beaker to which 100 mL of 50 mg/L indigo carmine dye was added, and an aliquot was picked at pre-determined time intervals till 2.0 hours. The portion of the solution was filtered through a 0.22 μm syringe filter. The absorbance of the dye in the solution was measured via an ultraviolet-visible (UV-vis) spectrophotometer, as shown in FIG. 5. The measured absorbance was employed to compute the sorption capacity of the nanohybrid, which reached 98.2 mg indigo carmine per 1.0 gram of the g-$C_3N_4$@$Fe_2O_3$/$MgAl_2O_4$.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of removing a contaminant from water, the method comprising:
   contacting contaminated water, comprising an organic pollutant, and a nanocomposite comprising graphitic $C_3N_4$, $Fe_2O_3$, and $MgAl_2O_4$ in a mass relationship to each other in a range of from 5 to 15:2 to 7:75 to 95, thereby adsorbing the organic pollutant onto the nanocomposite, as an adsorbed material and forming a nanocomposite product; and
   removing the adsorbed material from the contaminated water, thereby reducing a concentration of the organic pollutant in the contaminated water by at least 2 wt. %, and
   wherein the organic pollutant comprises a dye.

2. The method of claim 1, wherein an average pore distribution of the nanocomposite is bimodal, and
   wherein a BET specific surface area of the nanocomposite is in a range of from 15 to 45 m²/g, and/or
   wherein a first average pore diameter of the first mode of the nanocomposite, according to BJH measurement method, is in a range of from 6.3 to 10.03 nm, with a second average pore diameter of the second mode of the nanocomposite, according to BJH measurement method, being in a range of from 7.5 to 13 nm, and/or
   wherein an average pore volume of the nanocomposite, according to the BJH measurement method, is in a range of from 0.06 to 0.12 cm³/g.

3. The method of claim 1, wherein the nanocomposite further comprises MgO and has a (311) spinel interplanar spacing in a range of from 0.210 to 0.290 nm, a (006) $Fe_2O_3$ interplanar spacing in a range of from 0.180 to 0.260 nm, a (400) spinel interplanar spacing in a range of from 0.140 to 0.220 nm, a (220) MgO interplanar spacing in a range of from 0.108 to 0.188, a (620) spinel interplanar spacing in a range of from 0.090 to 0.170, and a (119) $Fe_2O_3$ and (622) $Fe_2O_3$ spinel interplanar spacing in a range of from 0.080 to 0.160, according to selected area diffraction.

4. The method of claim 1, wherein the mass relationship of $C_3N_4$:$Fe_2O_3$:$MgAl_2O_4$ in the nanocomposite is in a range of from 9 to 11:4 to 6:84 to 86,
   wherein the nanocomposite further comprises MgO and has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm,
   wherein an XRD spectrum of the nanocomposite under Cu-filtered Cu-Kα radiation (1.5418 Å) powered at 45 kV and 10 mA has 2θ peaks of
   an $MgAl_2O_4$ spinel phase at 18.9±1, 31.7±1, 44.8±1, 56.2±1, 74.09±1, and 78.1±1°,
   an MgO cubic phase at 42.8±1, 62.2±1, and 74.6±1°,
   an $Fe_2O_3$ hexagonal phase at 36.9±1, 44.8±1, 59.6±1, and 67.3±1°, and
   g-$C_3N_4$-related diffractions at 27.8±1, 36.8±1, 44.6±1, and 67.3±1°, and
   wherein no more than 1% relative intensity $MgFe_2O_4$ is detected in the XRD spectrum.

5. The method of claim 1, wherein the organic pollutant is adsorbed and comprises an indolinone sulfonate substructure in a mass ratio of 0.01 to 0.2 parts of the organic molecules per part of the nanocomposite in the nanocomposite product.

6. The method of claim 1, wherein carbon materials in the nanocomposite comprise no nanotubes.

7. The method of claim 1, wherein the nanocomposite comprises no more than 1 wt. % of carbonaceous materials besides graphitic $C_3N_4$.

8. The method of claim 1, wherein the nanocomposite comprises no more than 1 wt. % elemental state Fe, relative to total nanocomposite weight.

9. The method of claim 1, wherein the nanocomposite comprises no more than 1 wt. % elemental state metal, relative to total nanocomposite weight.

10. The method of claim 1, wherein the nanocomposite comprises no more than 1 wt. % Fe—N, relative to total nanocomposite weight.

11. The method of claim 1, wherein the nanocomposite comprises no mercaptan, amine, and carboxylic acid functional groups.

12. The method of claim 1, wherein the nanocomposite comprises no silyl functions.

13. The method of claim 1, wherein, relative to a total metal oxide weight, the nanocomposite further comprises
   no more than 10 wt. % MgO, and
   no more than 1 wt. % $ZrO_2$.

14. The method of claim 1, wherein the nanocomposite comprises no more than 10 wt. %, individually, of ZnO, $Fe_3O_4$, $CeFeO_3$, $GdFeO_3$, $LaFeO_3$, $BaTiO_3$, $CaTiO_3$, $SrTiO_3$, $CaZrO_3$, $PbTiO_3$, $Mg_{1-x}Ni_xFe_2O_4$ (x=0.6), Ag, $CoFe_2O_4$, $CuFe_2O_4$, $MnFe_2O_4$, $NiFe_2O_4$, $ZnFe_2O_4$, $Zn_{0.7}Ni_{0.15}Cu_{0.15}Fe_2O_4$, $Zn_{0.3}Ni_{0.7-x}Co_xFe_2O_4$ (0≤x≤0.7), $Mn_{0.1}Mg_{0.2}(Co, Ni, Zn)_{0.7}Fe_2O_4$, $LaCo_{0.5}Fe_{0.5}O_3$, $Mg_{0.1}$—$Co_{0.9}Fe_2O_4$, $Gd_2FeCrO_6$, $KTaO_3$, $NaTaO_3$, $NaNbO_3$, $KNbO_3$, $Pr_2Ti_2O_7$, $SiO_2$, $TiO_2$, ZnS, $Bi_4O_5I_2$, $SrFe_{0.5}Ta_{0.5}O_3$.

15. The method of claim 1, wherein the nanocomposite comprises no more than 10 wt. %, individually, relative to total metal content, of any of Zn, Ce, Gd, La, Ba, Ti, Ca, Sr, Zr, Pb, Ni, Ag, Co, Cu, Mn, Cd, Ta, Nb, Pr, and Bi, and
   wherein the nanocomposite comprises no more than 1 wt. %, individually, relative to total carrier weight, of $SiO_2$, $TiO_2$, ZnO, and ZnS.

16. An adsorbent, comprising:
   a nanocomposite comprising graphitic $C_3N_4$, $Fe_2O_3$, and $MgAl_2O_4$ in a mass relationship to each other in a range of from 5 to 15:2 to 7:75 to 95,
   wherein the nanocomposite is configured to absorb a contaminant comprising an organic pollutant onto the nanocomposite to form a nanocomposite product,
   wherein the nanocomposite further comprises MgO and has a (311) spinel interplanar spacing of 0.25±2% nm, a (006) $Fe_2O_3$ interplanar spacing of 0.22±2% nm, a (400) spinel interplanar spacing of 0.18±2% nm, a (220) MgO interplanar spacing of 0.148±2% nm, a (620) spinel interplanar spacing of 0.13±2% nm, and a (119) $Fe_2O_3$ and (622) $Fe_2O_3$ spinel interplanar spacing of 0.12±2% nm, wherein an XRD spectrum of the nanocomposite under Cu-filtered Cu-Kα radiation (1.5418 Å) powered at 45 kV and 10 mA has 2θ peaks of an $MgAl_2O_4$ spinel phase at 18.9±1, 31.7±1, 44.8±1, 56.2±1, 74.09±1, and 78.1±1°, an MgO cubic phase at 42.8±1, 62.2±1, and 74.6±1°, an $Fe_2O_3$ hexagonal phase at 36.9±1, 44.8±1, 59.6±1, and 67.3±1°, and g-$C_3N_4$-related diffractions at 27.8±1, 36.8±1, 44.6±1, and 67.3±1°, wherein no more than 1% relative intensity $MgFe_2O_4$ is detected in the XRD spectrum, and wherein the nanocomposite has a BET specific surface area in a range of from 15 to 45 $m^2/g$.

17. The adsorbent of claim 16, wherein the nanocomposite has a first average pore diameter of the first mode of the nanocomposite, according to BJH measurement method, in a range of from 6.3 to 10.03 nm, with a second average pore diameter of the second mode of the nanocomposite, according to BJH measurement method, in a range of from 7.5 to 13 nm, and an average pore volume, according to the BJH measurement method, in a range of from 0.06 to 0.12 $cm^3/g$.

18. The adsorbent of claim 17, wherein the BET specific surface area of the nanocomposite is 23.88±2 $m^2/g$, wherein the first average pore diameter of the first mode of the nanocomposite, according to BJH measurement method, is 8.3±1 nm, wherein the second average pore diameter of the second mode of the nanocomposite, according to BJH measurement method, is 10.87±1 nm, and wherein the average pore volume of the nanocomposite, according to the BJH measurement method, is 0.09±0.005 $cm^3/g$.

* * * * *